United States Patent [19]

Hehl

[11] 4,453,912

[45] Jun. 12, 1984

[54] ADJUSTABLE ROLLER TRACK BOGIES FOR DIE CARRIER FRAME OF INJECTION MOLDING MACHINE

[76] Inventor: Karl Hehl, Arthur-Hehl-Strasse 32, 7298 Lossburg 1, Fed. Rep. of Germany

[21] Appl. No.: 341,260

[22] Filed: Jan. 21, 1982

[30] Foreign Application Priority Data

Jan. 21, 1981 [DE] Fed. Rep. of Germany ..... 32101784
Oct. 14, 1981 [DE] Fed. Rep. of Germany ....... 3140740

[51] Int. Cl.³ .............................................. B29F 1/00
[52] U.S. Cl. ................................ 425/589; 425/450.1; 425/451
[58] Field of Search ................. 425/451, 450.1, 451.2, 425/589, 595; 308/6 C

[56] References Cited

PUBLICATIONS

"Industriewerke Schaeffer INA-Wälzlager", D-8522 Herzogenaurach, Germany, #304, Oct. 1979, pp. 122-125.

Primary Examiner—Donald E. Czaja
Assistant Examiner—James C. Housel
Attorney, Agent, or Firm—Joseph A. Geiger

[57] ABSTRACT

An adjustable exterior support and guide arrangement for the movable die carrier member of an injection molding machine consisting of two laterally spaced guide rails on the machine base with horizontally and vertically oriented runways engaged by correspondingly oriented vertical and horizontal recirculating roller tracks of a pair of guide bogies. Each guide bogie is adjustably, but not rigidly, connected to an inclined strut of the movable die carrier member and longitudinally entrained by means of a key pin of the inclined strut.

20 Claims, 5 Drawing Figures

ADJUSTABLE ROLLER TRACK BOGIES FOR DIE CARRIER FRAME OF INJECTION MOLDING MACHINE

BACKGROUND OF THE INVENTION

1. Field of the Invention

The present invention relates to injection molding machines and, more particularly, to the die closing unit of an injection molding machine and to adjustable roller track supporting means for the movable die carrier member of such a die closing unit.

2. Description of the Prior Art

In most injection molding machines, especially heavyduty machines, the movable die carrier member is guided for horizontal die opening and closing movements by means of two or four horizontal tie rods. Under the weight of die carrier member, the guide bushings tend to develop frictional heat and wear, with the result that the dimensional accuracy of the injection-molded parts declines. Replacement of the bushings is time consuming and costly, because it must be done by the manufacturer.

It has therefore already been suggested to relieve the tie rods of their load-carrying function with the aid of exterior guide elements which support the movable die carrier frame directly on the machine base, or on a cantilever-type guide frame which is attached to the machine base. These load-carrying exterior guide elements may be of the sliding or rolling type.

A rolling guide support on a cantilever frame is disclosed in German Pat. No. 21 37 284 and corresponding U.S. Pat. No. 3,841,823. Two guide rollers support the movable die carrier member on a pair of guide rails, and guide flanges on the rollers provide a certain lateral guidance.

Success in relieving the tie rods of their load-carrying function requires not only a high degree of manufacturing precision, but also considerable assembly skill. It has therefore also been suggested to provide vertical and, where necessary, horizontal adjustability in conjunction with the exterior guide elements. Vertical adjustability is suggested in the German Offenlegungsschrift (Publ. Application) No. 29 43 118 for a supporting roller, and in the German Offenlegungsschrift No. 30 06 230 for a supporting slide shoe. Vertical and horizontal adjustability is suggested in the German Offenlegungsschrift No. 30 29 597 and the corresponding U.S. Pat. No. 4,315,728, in connection with an angled slide shoe riding on horizontal and vertical faces of a guide rail.

The known adjustable exterior guide assemblies require a rigid connection between the die carrier member and the adjustable guide roller brackets or slide shoes, in order to prevent the latter from canting on the guide rails. Guide rollers have the obvious disadvantage of providing only line contact on the rails, thus having only a limited load-carrying capability.

For very heavy die carriers, it has therefore become necessary to resort to slide shoes with special synthetic lowfriction bearing plates, in order to reduce the specific contact pressure on the bearing surfaces. These slide shoes, however, have the shortcoming of creating a much higher frictional resistance than rollers and of generating a correspondingly high heat buildup which is detrimental to the life of the bearing surfaces. The higher frictional resistance also means a corresponding increase in the energy consumption of the hydraulic drive of the die closing unit.

It is also known, on the other hand, that comparatively high loads can be transmitted under rolling friction to a flat runway by means of a roller track assembly which uses an endless row of recirculating journal-free bearing rollers which pass between the runway and a parallel opposing face of a track core. The bearing rollers are laterally guided between the flanks of their track core and spaced apart in the sense of advance by means of spacer elements. Head pieces bolted to both ends of the track core serve as end covers and a recirculation guide for the bearing rollers. Such roller track assemblies are described, for example, in the sales catalog No. 304 of Industrie-Werke Schaefler INA-Walzlager, 8522 Herzogenaurach, Germany.

SUMMARY OF THE INVENTION

Underlying the present invention is the primary objective of devising an improved exterior guide support for the movable die carrier member of a die closing unit which, while preserving the advantages of rolling friction, offers a much higher load-carrying capability than has been possible in the past, by distributing the load over a plurality of high-precision bearing rollers. Additionally, the guide elements are to be of low cost, interchangeable, and preferably commercially available. Lastly, the size and number of bearing rollers is to be readily gradable, in order to adapt the support to the widest possible range of weight classes of die closing unit.

The present invention proposes to attain these objectives by suggesting an adjustable support and guide arrangement for the movable die carrier member of an injection molding machine which comprises two fixed guide rails on the upper side of the machine base, near the lower corners of the movable die carrier member, and two guide bogies which are connected to the movable die carrier member so as to engage the guide rails. Each guide bogie has at least one endless row of cylindrical bearing rollers arranged in a recirculating roller track configuration, so that a vertical load on the guide bogie is always transmitted to the runway by a number of bearing rollers. The guide bogies are vertically adjustable in relation to the movable die carrier member, so that it becomes possible to transfer from the tie rods to the guide rails at least a substantial portion of the weight of the movable die carrier member.

In a preferred embodiment of the invention, the roller track assembly of each guide bogie has its recirculating bearing rollers arranged in a loosely contiguous relationship inside a roller track cassette, the latter consisting of a track core and two track covers on opposite longitudinal sides of the core. The bearing rollers have small trunnions with which they engage circulation grooves in the track covers.

Each roller track cassette is engaged in a cross-sectionally rectangular longitudinal recess of the guide bogie, being secured to the latter by means of load-free positioning screws. The extremities of each roller track recess are closed off by means of plastic end panels positioned by transverse grooves in the recesses. Each end panel supports a transverse portion of a circumferential wiper seal.

The invention further suggests both horizontal and vertical runways on the guide rails and angular guide bogies with cooperating vertical and horizontal roller track assemblies. By providing appropriate vertical and horizontal adjustment screws on inclined struts of the movable die carrier member, it is possible to have the orientation of the guide bogies determined exclusively by the guide rail runways, the bogies being simply held captive between the runways and the adjustment screws and entrained longitudinally by means of a key pin in each inclined strut.

The guide rails, the guide bogies and the inclined struts of the movable die carrier member may have a common inclined symmetry plane. By appropriately setting the vertical and horizontal adjustment screws for the guide bogies, it is possible to free the tie rods of the die closing unit of virtually all guide functions. The proper setting of the adjustment screws is verifiable by means of a special verification gauge which is mountable on the stationary die carrier member.

The guide bogies of the proposed adjustable support and guide arrangement combine the advantages of rolling friction with a much higher load-carrying capacity than was previously possible. The captive, non-rigid arrangement of the guide bogies further improves the guidance by eliminating any potential misalignment problems. Lastly, the novel support and guide arrangement simplifies the assembly of the injection molding machine by providing an automatic lateral centering for the die closing unit, so that it is no longer necessary for the die closing unit to be bolted down on the machine base.

BRIEF DESCRIPTION OF THE DRAWINGS

Further special features and advantages of the invention will become apparent from the description following below, when taken together with the accompanying drawings which illustrate, by way of example, an embodiment of the invention, represented in the various figures as follows.

DESCRIPTION OF THE PREFERRED EMBODIMENT

Figure 5:
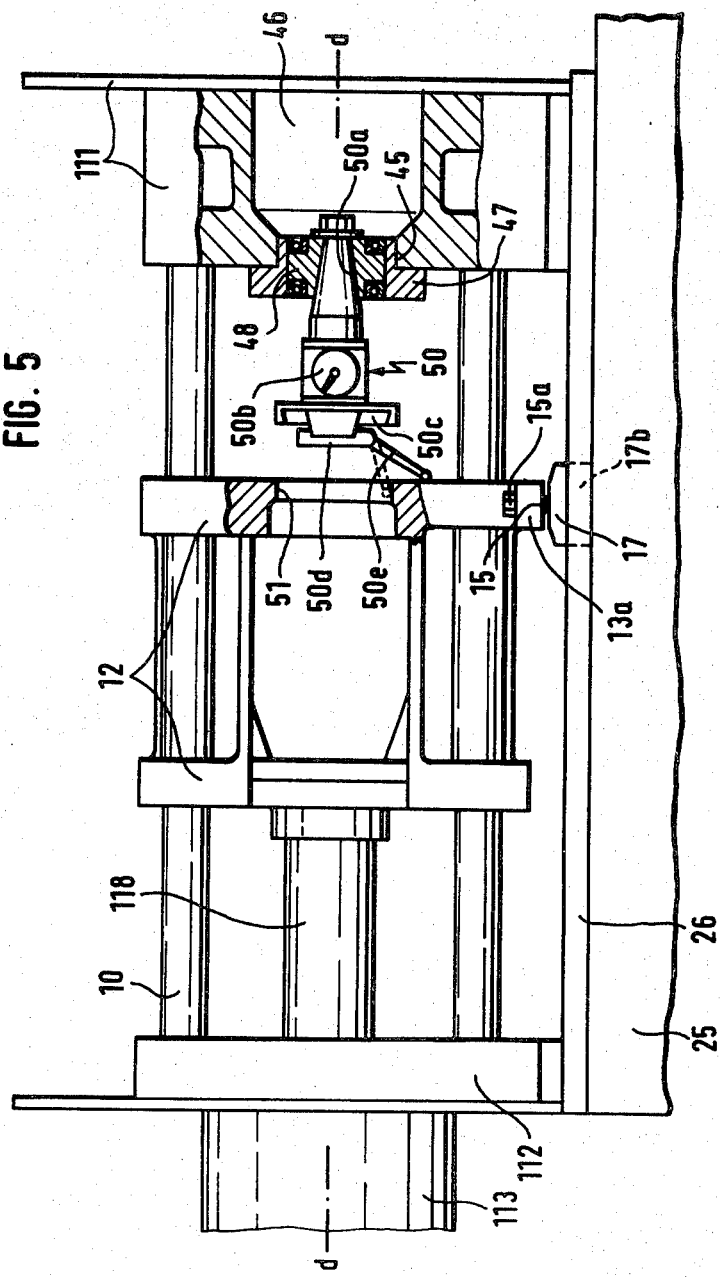
FIG. 5 shows a push-type die closing unit, as part of an injection molding machine, with a support and guide arrangement and a verification gauge.

In FIG. 5 is shown a push-type die closing unit which is supported by a machine base 25 and which consists essentially of a stationary head plate 112 on one axial end, a stationary die carrier plate 111 on the other axial end, a movable die carrier frame 12 between the two stationary plates, and four parallel horizontal tie rods 10 extending through the movable die carrier member 12. To the rear side of the stationary head plate 112 is attached a hydraulic drive cylinder 113 whose piston rod 118 drives the movable die carrier member 12.

The movable die carrier member 12 has a die carrier wall to which are connected two guide bogies 17 which support the forward portion of the die carrier member 12 and the attached movable die half (not shown) on a pair of guide rails 26 arranged on the upper side of the machine base 25. Details of this support and guide arrangement are shown in FIGS. 1-4.

Figure 1:
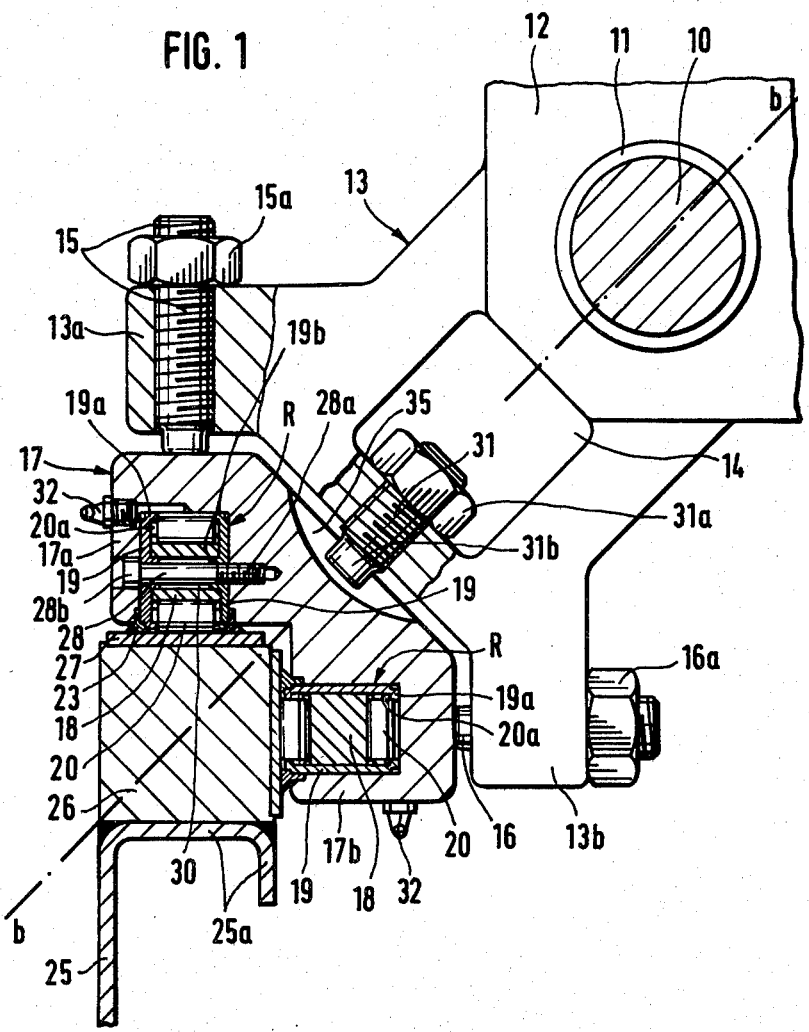
FIG. 1 shows the support and guide arrangement of the invention in an end view and partial transverse cross section, as arranged on a corner of a movable die carrier member.
Figure 2:
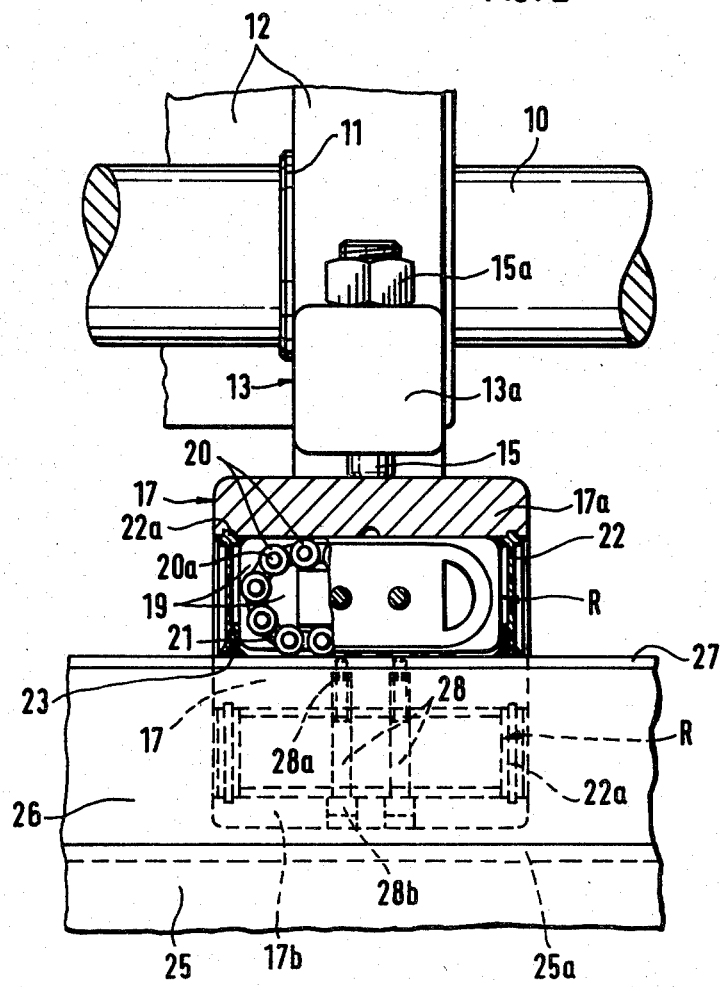
FIG. 2 shows the arrangement of FIG. 1 in a side view and partial longitudinal cross section.

FIGS. 1 and 2 show the lower right-hand corner of the movable die carrier member 12, where an inclined strut 13 extends downwardly and laterally outwardly from the die carrier wall of the member 12. The inclined strut 13 has a horizontal heel portion 13a with a vertical adjustment screw 15 aligned above the guide rail 26 and a vertical heel portion 13b with a horizontal adjustment screw 16 similarly aligned with the guide rail 26. The adjustment screws 15 and 16, secured by means of counternuts 15a and 16a, respectively, engage horizontal and vertical outer faces of the guide bogie 17 which has corresponding horizontal and vertical leg portions 17a and 17b, respectively.

By appropriately adjusting the vertical adjustment screw 15, it is possible to position the movable die carrier member 12 in such a way that at least a substantial portion of the weight of the movable die carrier member and attached die half can be transferred to the horizontal runway strip 27 of the guide rail 26, via the vertical adjustment screw 15 and the guide bogie 17.

The horizontal adjustment screws 16 on opposite sides of the die carrier member 12 can be adjusted to assist the tie rods 10 in their lateral guide function by providing lateral guidance between the guide bogie 17 and a vertical runway strip 27 of the guide rail 26. This exterior lateral guidance for the movable die carrier member 12 will thereby also absorb any lateral forces which may be exerted on the injection molding die by transversely mounted accessory devices, or lateral forces which may result from an inclined orientation of the machine base, when the latter is not mounted at level, for example.

As can best be seen in FIG. 1, the guide bogie 17 is not attached to the inclined strut 13, but simply maintained captive between its adjustment screws 15 and 16 and the guide rail 26. It follows that the orientation of the guide bogie 17 is determined exclusively by its guiding engagement with the runway strips 27 of the guide rail 26. The alignment position of the guide bogie 17 therefore remains unaffected by any resetting of the adjustment screws 15 and 16, or of the threaded key pin 31 which, by engaging a transverse groove 35 of the guide bogie 17, entrains the latter to follow the movements of the die carrier member 12.

For this purpose, the threaded key pin 31 has a drive extremity 31b of smaller diameter which fits the width of the transverse groove 35, without touching its arcuate bottom. A counter-nut 31a, arranged in an opening 14 of the inclined strut 13, secures the key pin 31. The fitted engagement between the drive extremity 31a of the key pin 31 and the transverse groove 35 is such that movement freedom in all but the longitudinal sense is maintained, so that binding conditions are positively precluded.

The inclined strut 13 and the angled guide bogie 17 are preferably so arranged that they have a common symmetry plane b—b (FIG. 1) which also coincides with a diagonal plane through the guide rail 26 and the nearest tie rod 10. The symmetry plane b—b is preferably inclined at 45 degrees.

An optimal adjustment of the support and guide arrangement of this invention is present, when the guide bogies 17 are subjected to such loads in the vertical and horizontal directions that the tie rods 10 are thereby relieved of their normal load-carrying function and that they are also substantially relieved of their lateral guide functions. As a result, the wear in the guide bushings 11 is reduced to a minimum, and the tie rods 10 are subjected to purely axial tension or compression stresses.

The proposed exterior support and guide arrangement is more accurate than the guidance obtained by means of the tie rods 10, and it has the advantage of infinite adjustability, for a precise alignment of the two injection molding die halves. This added precision is most important in connection with the production of precision-molded parts which require a high degree of dimensional consistency.

The adjustment of this support and guide arrangement can be accomplished by means of a special verification gauge 50 which is shown in FIG. 5 and which indicates the trueness of concentricity between centering bores 45 and 51 of the stationary die carrier plate 111 and the movable die carrier member 12, respectively, as well as the parallel alignment between their opposing die mounting faces.

For this purpose, the verification gauge 50 includes an adaptor base 47 which is centered in the bore 45 of the stationary die carrier plate 111, the adaptor base 47, in turn, carrying a rotatable holder 48 into which is inserted the tapered shaft 50a of a dial gauge 50b. On the end face of the dial gauge housing is arranged an indicator slide 50c which provides transverse mobility for an indicator head 50d. The latter carries a pivotable indicator finger 50e which can be brought into engagement with either the cylindrical surface of the centering bore 51 of the movable die carrier member 12 or with the mounting face of the latter.

In the first of the two sensing modes, the dial gauge 50b indicates the trueness of concentricity of the two die carrier centering bores, in the second sensing mode it indicates the trueness of parallel alignment between their die mounting faces. During the adjustment procedure, the movable die carrier member 12 is preferably loaded down with a weight that corresponds to the weight of an average movable molding die half.

The relative movement freedom between the guide bogies 17 and their associated inclined struts 13 in all but the axial direction makes it possible to arrange in the horizontal and vertical heel portions of the guide bogie 17 a comparatively long roller track with a number of evenly loaded bearing rollers 20. The latter are arranged loosely contiguous in an endless oblong row which is defined by two circulation grooves 21. Successive bearing rollers 20 are thus free to touch each other, but are not subjected to any forces in the direction of rolling advance. The exclusive centering of the guide bogies 17 on the guide rails 26 thereby assures the parallel alignment of the oppositely rotating bearing rollers 20.

Figure 3:
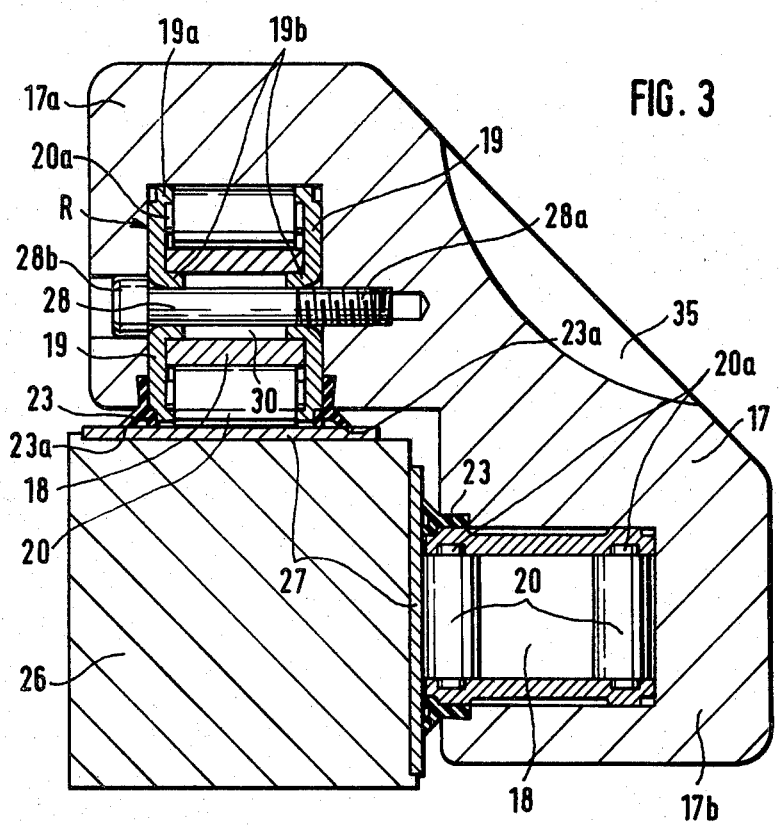
FIGS. 3 and 4 show enlarged details of the guide bogie of FIGS. 1 and 2, respectively, the cross section of the vertical roller track of FIG. 3 being taken along line IIIa—IIIa of FIG. 4, and the cross section of the horizontal roller track being taken along line IIIb—IIIb of FIG. 4.
Figure 4:
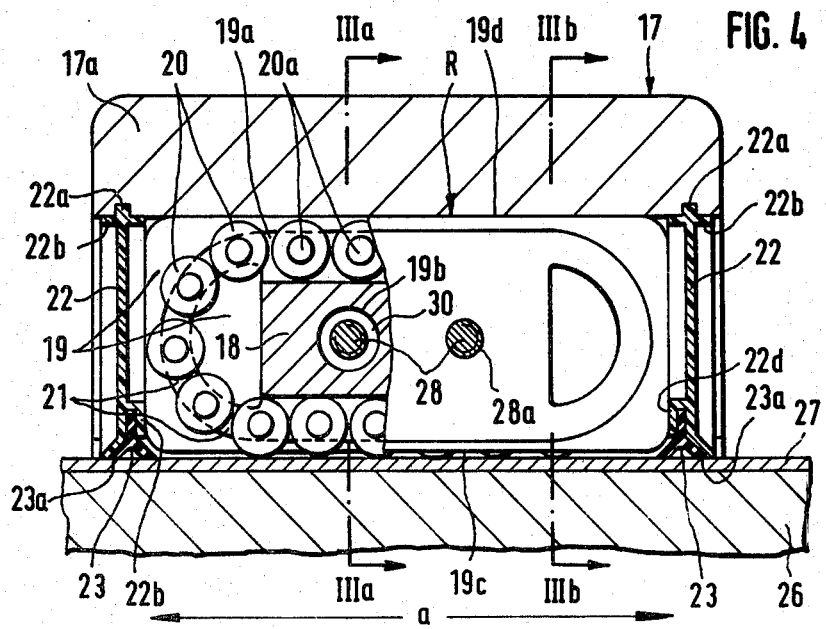

Each heel portion 17a or 17b of the guide bogie 17 has arranged in it a cross-sectionally rectangular recess receiving therein a roller track cassette R, as part of a roller track assembly. The roller track cassette R consists essentially of an elongated track core 18 of rectangular cross section and of two lateral track covers 19 which engage the track core 18 from opposite sides. The bearing rollers 20 have short trunnions 20a on both axial extremities with which they engage the circulation grooves 21 of the lateral track covers 19 (FIG. 3).

The outer side of the track core 18 is arranged parallel to the surface of the runway strip 27, so as to accommodate a number of bearing rollers 20 therebetween, in a force-transmitting relationship with the track core 18 and the runway strip 27. In this region, the circulation groove is likewise linear.

The vertical and horizontal cassette-receiving recesses in the horizontal and vertical heel portions 17a and 17b of the guide bogie 17 extend parallel to the movement direction a—a of the guide bogie 17. The roller track cassettes R are retained in their recesses by means of track positioning screws 28 which reach transversely through the cassettes 19. The screws 28 are not intended to transmit any bearing load from the roller track cassette R to the guide bogie 17. They therefore reach with clearance through inwardly extending centering flanges 19b of the lateral track covers 19 which, in turn, engage matching supporting bores 30 of the track core 18.

The lateral track covers 19 are preferably manufactured of steel sheet, being shaped in a die-cutting and forming operation. The semi-circular reversing portions of the circulation grooves 21 are indented groove profiles (FIG. 3); the inner and outer straight portions of the circulation groove 21 are preferably only half-grooves formed by longitudinal shoulders along the edges 19c and 19d of the track covers 19.

The centering flanges 19b of the lateral track covers 19 are so arranged in relation to the longitudinal edges 19c and 19d of the lateral track covers 19 that the protruding cover edge 19c is set back from the periphery of the force-transmitting bearing rollers 20 so as not to touch the runway strip 27, while the inserted cover edge 19d reaches beyond the periphery of the returning bearing rollers 20, so as to produce a passageway between the bottom of the cassette-receiving recess and the inner side of the track core 18 which allows for the returning bearing rollers 20 to pass freely along the circulation groove 21.

Accordingly, the force flow from the guide rail 26 into the guide bogie 17 involves, in succession, a number of bearing rollers 20, the outwardly facing side of the track core 18, the track core bores 30 engaged by the centering flanges 19b of the track covers 19, and the inserted edges 19b of these covers, in abutment against the bottom of the cassette-receiving recess of the guide bogie 17.

The axial extremities of the roller track cassette R are covered by two transverse end panels 22 of rectangular outline. Each end panel 22 has on three of its sides a peripheral bead 22a of tapered cross section which is engaged in a transverse retaining groove in the walls of the cassette-receiving recess. Rim flanges 22b on opposite sides of the peripheral bead 22a abut against the recess walls, thereby giving the plastic end panel 22 additional stiffness.

Surrounding the roller track cassette R is an endless wiper seal 23 which contacts the runway strip 27 with a wiper lip 23a. A tapering portion of the wiper seal 23 is clamped between the lateral track covers 19 and shallow longitudinal edge recesses in the recess walls of the guide bogie 17. The transverse portions of the wiper seal 23 are held in place by an offset ledge 22d on the exposed edge of the two end panels 22.

The novel exterior support and guide arrangement of the invention has the advantage of being readily accessible for inspection and service. The roller track guide bogies can be removed and inspected or replaced in the field in a very simple procedure. While the foregoing description refers to the use of guide bogies in connection with a push-type die closing unit with stationary tie rods, it should be obvious that the same advantages can be realized in a pull-type die closing unit, where extended piston rods serve as the horizontal tie rods.

It should be understood, of course, that the foregoing disclosure describes only a preferred embodiment of the invention and that it is intended to cover all changes and modifications of this example of the invention which fall within the scope of the appended claims.

I claim the following:

1. In an injection molding machine in which a machine base carries a die closing unit which opens and closes along a substantially horizontal movement axis and which includes a stationary die carrier member to which is attachable the stationary half of an injection molding die, a movable die carrier member to which is attachable the movable half of said die, and a set of parallel substantially horizontally extending tie rods which determine said movement axis by reaching through the movable die carrier member so as to position and guide the latter, the combination therewith of an adjustable exterior support and guide arrangement for the movable die carrier member comprising:

two fixed guide rails arranged on the machine base in parallel alignment with the tie rods of the die closing unit, below and on laterally opposite sides of the movable die carrier member, the guide rails having horizontally oriented flat runways on their upper sides and substantially vertically oriented flat runways on their inner sides;

two guide bogies connected to the movable die carrier member and associated with the two guide rails in such a way that each guide bogie cooperates with the horizontal and vertical runways of the associated guide rail, to be supported and guided by the latter;

means associated with the guide bogies for vertically adjusting each guide bogie in relation to the movable die carrier member, so as to make it possible to transfer at least a substantial portion of the weight of the movable die carrier member and attached die half from the tie rods to the guide rails; and means associated with the guide bogies for horizontally adjusting each guide bogie in relation to the movable die carrier member, so as to make it possible to transfer at least a substantial portion of the lateral guidance interaction between the movable die carrier member and the machine base from the tie rods to the guide rails; and wherein each guide bogie has a horizontal leg extending over the horizontal runway of the associated guide rail and a vertical leg extending on the inside of the vertical runway of the guide rail;

each leg of the two guide bogies has a longitudinal recess of rectangular cross section with parallel flanks oriented perpendicularly to the associated guide rail runway and a bottom in parallel alignment with said runway;

the recesses in the horizontal legs of the two guide bogies hold each a vertical roller track assembly with a vertical roller track cassette enclosing an endless row of cylindrical bearing rollers moving along an oblong vertical recirculation track above the horizontal runway of the associated guide rail, so that, in all longitudinal positions of the movable die carrier member, a vertical load on the guide bogie is transmitted to said horizontal runway by a plurality of bearing rollers;

the recesses in the vertical legs of the two guide bogies hold each a corresponding horizontal roller track assembly with a horizontal roller track cassette enclosing horizontally recirculating bearing rollers which cooperate coorespondingly with the vertical runway of the associated vertical guide rail;

each vertical roller track cassette includes a central track core with at least a lower roll face in parallel alignment with the horizontal runway and bearing against the force-transmitting rollers from the upper side, and two lateral track covers of generally rectangular outline engaging the vertical longitudinal sides of the track core, the track covers positioning the roller track assembly in the associated recess against the recess flanks while abutting vertically against the recess bottom with their upper longitudinal edges, so as to transmit bearing forces from the track core to the roller bogie; and the horizontal roller track assembly has its roller track cassette correspondingly constituted and engaged in the recess of the vertical leg of the guide bogie.

2. An adjustable die carrier supporting arrangement as defined in claim 1, wherein the track cores of the roller track cassettes have upper and lower roll faces;

the lateral track covers are attached to the vertical longitudinal sides of the track core, each lateral track cover having on its inwardly facing side an oblong circulation groove circumscribing the track core;

the bearing rollers have short guide trunnions on both axial extremities engaging the circulation grooves of the two lateral track covers with clearance, so that movements of the guide bogie cause the force-free bearing rollers to push each other in a loosely contiguous relationship, along an oblong circulation path of which at least the curved portions are defined by the circulation grooves; and the horizontal roller track assembly is a 90°-rotated vertical roller track assembly.

3. An adjustable die carrier supporting arrangement as defined in claim 2, wherein the outline of the oblong circulation grooves in the lateral track covers is defined by two parallel straight-line portions, joined at both ends by a semi-circle;

each of the lateral track covers has a rectangular central recess extending longitudinally between the centers of said semicircles and vertically between the straight-line portions of said grooves; and the length of the track core corresponds to the length of said rectangular recesses of the track covers.

4. An adjustable die carrier supporting arrangement as defined in any one of claims 1 through 3, wherein the track core has the shape of a bar of rectangular cross section, with at least two horizontal transverse bores extending therethrough; and the lateral track covers have inwardly extending centering protrusions engaging the bores of the track core from opposite sides, thereby transmitting from the track core to the lateral track covers the bearing forces which have been transmitted to the track core by the bearing rollers.

5. An adjustable die carrier supporting arrangement as defined in claim 4, wherein the centering protrusions of the lateral track covers are tubular extensions; and each roller track assembly includes attachment bolts extending through the transverse bores of the track core and the tubular centering protrusions of the lateral track covers into engagement with the guide bogie, so as to clamp the roller track cassette to the guide bogie.

6. An adjustable die carrier supporting arrangement as defined in any one of claims 1 through 3, wherein the cassette-receiving recesses in the legs of the guide bogies are longer than the roller track cassettes;

each roller track assembly further includes two transversely oriented end panels arranged near the axial extremities of the cassette-receiving recess; and said end panels include wiper means for the establishment of a wiping seal between the guide bogies and the runways on the guide tracks.

7. An adjustable die carrier supporting arrangement as defined in claim 6, wherein the lower longitudinal edges of the lateral track covers reach into the immediate vicinity of the runways on the guide rails, and the legs of the guide bogies reach likewise into the vicinity of said runways;

the flanks of the cassette-receiving recesses in said legs include shallow edge recesses facing the lower edges of the lateral track covers to form slender longitudinal groove portions with the latter;

each end panel has a ledge formation defining a slender transverse groove portion of similar slender shape in the vicinity of the runway, said longitudinal and transverse groove portions thereby forming a substantially continuous groove of rectangular outline; and the wiper means of the end panels is in the form of an annular wiper seal of a cross-sectional profile which includes a narrow shank portion fitting into said slender groove and an upstanding lip portion in wiping contact with the runway.

8. An adjustable die carrier supporting arrangement as defined in claim 7, wherein the end panels of the roller track assemblies are injection-molded plastic parts of rectangular outline, having reinforcing rim flanges on the three sides engaged against the bottom and the two flanks of the cassette-receiving recesses and peripheral protrusions engaging matching positioning recesses in said bottom and flanks.

9. An adjustable die carrier supporting arrangement as defined in claim 1, wherein the guide bogies and the movable die carrier member define means for the longitudinal entrainment of the guide bogies by the movable die carrier member, said entrainment means being restricted to the transmission of longitudinal forces between the movable die carrier member and the guide bogies;

the movable die carrier member has two horizontal heel portions arranged above the horizontal legs of the two guide bogies to form horizontally coextensive members;

the vertical adjustment means include, for each guide bogie, a vertically adjustable adjustment member which is carried by one of said horizontally coextensive members while bearing against a horizontal surface of the other member with displacement freedom in at least the transverse horizontal direction;

the movable die carrier member has two vertical heel portions arranged laterally inside the vertical legs of the two guide bogies to form vertically coextensive members;

the horizontal adjustment means include, for each guide bogie, a horizontally adjustable adjustment member which is carried by one of said vertically coextensive members while bearing against a vertical surface of the other member with displacement freedom in at least the vertical direction.

10. An adjustable die carrier supporting arrangement as defined in claim 9, wherein the entrainment means includes an entrainment groove with parallel vertical flanks in each guide bogie and two cooperating entrainment pins in the movable die carrier member, each entrainment pin having a cylindrical drive extremity engaging the flanks of one of the entrainment grooves with displacement freedom in the transverse horizontal and vertical directions.

11. An adjustable die carrier supporting arrangement as defined in claim 9, wherein the vertically adjustable adjustment members are vertical adjustment screws which are received in vertical threaded bores of the horizontal heel portions of the movable die carrier member, bearing against upwardly facing horizontal surfaces of the associated horizontal legs of the guide bogie; and the horizontally adjustable adjustment members are horizontal adjustment screws which are received in horizontal threaded bores of the vertical heel portions of the movable die carrier member, bearing against inwardly facing vertical surfaces of the associated vertical legs of the guide bogie.

12. An adjustable die carrier supporting arrangement as defined in claim 1, wherein the die closing unit has four tie rods so arranged that their axes coincide with the four corners of a rectangle with horizontal and vertical sides;

the guide rails are arranged below and laterally outside the two lower tie rods, and the edge lines defined by the intersection between the horizontal and vertical runways of the guide rails substantially coincide with the two diagonal planes which are defined by the two pairs of diagonally opposite tie rod axes;

the two guide bogies have an angular cross-sectional outline, with horizontal and vertical legs extending over the horizontal and vertical runways of the guide rails, on opposite sides of said diagonal planes;

the movable die carrier member has two diagonally inclined struts extending in substantial alignment with the two diagonal planes, the inclined struts forming horizontal heel portions above the horizontal legs of the guide bogies and vertical heel portions on the inside of the vertical legs of the guide bogies;

the vertical adjustment means includes an adjustment screw in the horizontal heel portion of the inclined strut which bears downwardly against an upper face of the horizontal leg of the guide bogie; and the horizontal adjustment means includes an adjustment screw in the vertical heel portion of the inclined strut which bears outwardly against an inwardly oriented face of the vertical leg of the guide bogie.

13. In an injection molding machine in which a machine base carries a die closing unit which opens and closes along a substantially horizontal movement axis and which includes a stationary die carrier member to which is attachable the stationary half of an injection molding die, a movable die carrier member to which is attachable the movable half of said die, and a set of parallel substantially horizontally extending tie rods which determine said movement axis by reaching through the movable die carrier member so as to position and guide the latter, the combination therewith of an adjustable exterior support and guide arrangement for the movable die carrier member comprising:

two fixed guide rails arranged on the machine base in parallel alignment with the tie rods of the die closing unit, below and on laterally opposite sides of the movable die carrier member, the guide rails having horizontally oriented flat runways on their upper sides and substantially vertically oriented flat runways on their inner sides;

two guide bogies connected to the movable die carrier member and associated with the two guide rails in such a way that each guide bogie engages the horizontal and vertical runways of the associated guide rail in a guiding action, each guide bogie having a horizontal leg cooperating with the horizontal runway of the associated guide rail and a vertical leg cooperating with the vertical runway of the guide rail;

two horizontal heel portions of the movable die carrier member arranged above the horizontal legs of the two guide bogies to form horizontally coextensive members, each horizontal heel portion being supported on the associated guide bogie leg by means of a vertically adjustable adjustment member which is carried by one of the horizontally coextensive members while bearing against a surface of the other member with displacement freedom in at least the transverse horizontal direction;

two vertical heel portions of the movable die carrier member arranged laterally inside the vertical legs of the two guide bogies to form vertically coextensive members, each vertical heel portion being laterally positioned in relation to the associated guide bogie leg by means of a horizontally adjustable adjustment member which is carried by one of the vertically coextensive members while bearing against a surface of the other member with displacement freedom in at least the vertical direction; and means defined by the movable die carrier member and the guide bogies for the longitudinal entrainment of the guide bogies by the movable die carrier member, said entrainment means being restricted to the transmission of longitudinal forces between the movable die carrier member and the guide bogies.

16. An adjustable die carrier supporting arrangement as defined in claim 13, wherein the movable die carrier member and the two guide bogies form two coextensive body portions at each guide bogie; and the entrainment means includes a transverse entrainment groove with parallel vertical flanks in one of said body portions and a matching entrainment protrusion in the other body portion engaging the flanks of the entrainment groove with displacement freedom in the transverse horizontal and vertical directions.

15. An adjustable die carrier supporting arrangement as defined in claim 14, wherein the coextensive body portions of the movable die carrier member and of the guide bogies are upwardly and inwardly inclined body portions;

the entrainment groove of the entrainment means is an upwardly open groove in the inclined body portion of the guide bogie; and the entrainment protrusion is a perpendicularly inclined key pin threaded into the inclined body portion of the movable die carrier member, the key pin having a cylindrical drive extremity engaging the flanks of the entrainment groove.

16. An adjustable die carrier supporting arrangement as defined in claim 13, wherein the vertically adjustable adjustment members are vertical adjustment screws which are received in vertical threaded bores of the horizontal heel portions of the movable die carrier member, bearing against upwardly facing horizontal surfaces of the associated horizontal legs of the guide bogie; and the horizontally adjustable adjustment members are horizontal adjustment screws which are received in horizontal threaded bores of the vertical heel portions of the movable die carrier member, bearing against inwardly facing vertical surfaces of the associated vertical legs of the guide bogie.

17. An adjustable die carrier supporting arrangement as defined in claim 13, wherein each guide bogie holds a first endless row of cylindrical bearing rollers arranged in a vertically recirculating roller track configuration above the horizontal runway of the associated guide rail, so that, in all longitudinal positions of the movable die carrier member, a vertical load on the guide bogie is transmitted to said horizontal runway by a plurality of bearing rollers; and each guide bogie also holds a similar second endless row of cylindrical bearing rollers arranged in a horizontally recirculating roller track configuration and cooperating in a similar way with the vertical runway of the associated guide rail, thereby producing a guiding interaction between the two guide bogies and the vertical guide faces of the two guide rails.

18. An adjustable die carrier supporting arrangement as defined in claim 17, wherein the first bearing rollers are part of a vertical roller track assembly, and the second bearing rollers are part of a similar horizontal roller track assembly;

the vertical roller track assembly includes a roller track cassette which is attached to the guide bogie and which positions and partially encloses the bearing rollers;

each roller track cassette includes an elongated central track core with upper and lower roll faces of which at least the lower one is parallel aligned with the horizontal runway, the lower roll face and the runway engaging the force-transmitting bearing rollers from opposite sides;

each roller track cassette further includes two lateral track covers of generally rectangular outline attached to the vertical longitudinal sides of the track core, each lateral track cover having on its inwardly facing side an oblong circulation groove circumscribing the track core;

the bearing rollers have short guide trunnions on both axial extremities engaging the circulation grooves of the two lateral track covers with clearance, so that movements of the guide bogie cause the force-free bearing rollers to push each other in a loosely contiguous relationship, along an oblong circulation path of which at least the curved portions are defined by the circulation grooves; and the horizontal roller track assembly is a 90°-rotated vertical roller track assembly.

19. An adjustable die carrier supporting arrangement as defined in claim 18, wherein the track core is of rectangular cross section, having at least two horizontal transverse bores; and the lateral track covers have inwardly extending centering protrusions engaging the bores of the track core from opposite sides, thereby transmitting from the track core to the lateral track covers the bearing forces which have been transmitted to the track core by the bearing rollers.

20. An adjustable die carrier supporting arrangement as defined in claim 18, wherein the horizontal and vertical legs of the guide bogie have each a longitudinal recess facing the associated runway of the guide rail, for the accommodation therein of a roller track assembly;

each recess has a rectangular cross section formed by two parallel flanks oriented perpendicularly to the associated runway and a recess bottom in parallel alignment with said runway;

the vertical roller track assembly has its roller track cassette engaged in the recess of the horizontal guide bogie leg in such a way that the upper longitudinal edges of its lateral track covers abut against the bottom of said recess, thereby transmitting the bearing forces from the lateral track covers to the guide bogie, while determining a vertical space between the bottom of the recess and the upper roll face of the track core which allows for the bearing rollers to circulate with clearance; and the horizontal roller track assembly has its roller track cassette similarly engaged in the recess of the vertical leg of the guide bogie.

* * * * *